Figures 1, 2:
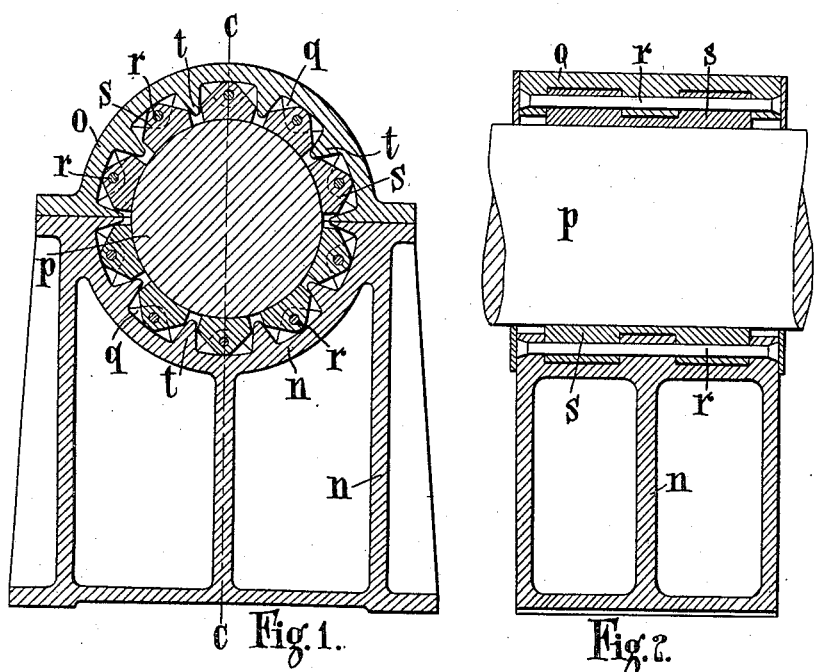

C. A. PARSONS.
BEARING.
APPLICATION FILED SEPT. 11, 1913.

1,086,308.

Patented Feb. 3, 1914.

WITNESSES
H. L. Alden
H. M. Barrett

INVENTOR
Charles A. Parsons
BY Spear Middleton Donaldson & Spear
ATTORNEY

UNITED STATES PATENT OFFICE.

CHARLES ALGERNON PARSONS, OF NEWCASTLE-UPON-TYNE, ENGLAND.

BEARING.

1,086,308.    Specification of Letters Patent.    Patented Feb. 3, 1914.

Application filed September 11, 1913. Serial No. 789,347.

*To all whom it may concern:*

Be it known that I, CHARLES ALGERNON PARSONS, a subject of the King of Great Britain and Ireland, and residing at Heaton Works, Newcastle-upon-Tyne, in the county of Northumberland, England, have invented certain new and useful Improvements in and Relating to Bearings, of which the following is a specification.

This invention relates to thrust and other bearings of the type in which the bearing or pressure blocks are pivoted, its object being to provide an improved form in which the direction of relative motion between the parts of the bearing can be reversed without complication in the bearing structure.

The invention consists in a thrust or like bearing in which each pressure block is pivoted on a pin whose axis lies in a plane at right angles to the direction of relative motion between the bearing parts and bisecting the area of the block contacting surface.

The invention also consists in the improved thrust and other bearings as hereinafter described.

Referring now to the accompanying drawings:—Figure 1 is a transverse section of a shaft bearing constructed according to the present invention. Fig. 2 is a sectional elevation on the line C—C of Fig. 1.

In bearings according to this invention, the lubricant forms between such contacting surfaces a film which is thicker at its leading edge than at its trailing edge, and as each block is centrally pivoted, such a film is formed during either direction of relative motion between the bearing parts. The bearing thus constructed admits of such relative movement in either direction without necessitating any complication in the bearing structure.

The present invention may be applied to ordinary shaft or other bearings. Thus, according to the construction of bearing shown in Figs. 1 and 2, a shaft $p$ is inclosed between a support, $n$, and a cover, $o$, bolted thereto in the usual manner. Extending inward toward the center of the shaft $p$ is a series of projections $q$ which are formed on the cylindrical surfaces of the parts $n$ and $o$. Each projection, $q$, carries a pin $r$, passing through the pressure blocks $s$, in contact with the shaft $p$, and forming a pivotal axis for such blocks, the movement of the latter being preferably limited by additional projections $t$, alternating with the projections $q$.

As before, the axis of pivoting of each pressure block $s$, is in a plane at right angles to the direction of relative motion between the shaft $p$ and the bearing blocks $s$, and according to the present invention the axis of pivoting bisects the area of the contacting surface of the block.

A bearing in which the pressure blocks are thus pivoted permits of the shaft running in either direction, and lubricant being introduced into the bearing in any suitable manner, lubrication is equally effective in either direction of rotation.

It will be understood, of course, that in a bearing thus constructed, any number of pressure blocks $s$, may be employed, and that further, such blocks need only be arranged around the bottom of the bearing in which case an ordinary semi-cylindrical top bearing surface is usually provided to retain the shaft in position.

Many further modifications can obviously be made in the details of carrying the invention into effect without in any way departing from the spirit of the same.

Having now described my invention, what I claim as new and desire to secure by Letters Patent is:—

In combination a shaft, a bearing casing, a plurality of bearing shoes having bearing surfaces engaging the shaft laterally supporting said shaft, each shoe having a supporting surface by which the shoe is tiltably supported on the casing, a supporting pivot pin passing through each shoe between the bearing surface of the shoe and the supporting surface of the shoe, and secured to the casing, substantially as described.

In testimony whereof, I have affixed my signature in presence of two witnesses.

CHARLES ALGERNON PARSONS.

Witnesses:
WILLIAM SHEARER,
ALBERT WILLIAM PARR.